Dec. 29, 1942.  W. A. RAY  2,306,903
FUEL GOVERNOR
Filed Dec. 4, 1939   2 Sheets-Sheet 1

WILLIAM A. RAY,
Inventor;

John H. Rouse,
Attorney.

Dec. 29, 1942. W. A. RAY 2,306,903
FUEL GOVERNOR
Filed Dec. 4, 1939 2 Sheets-Sheet 2
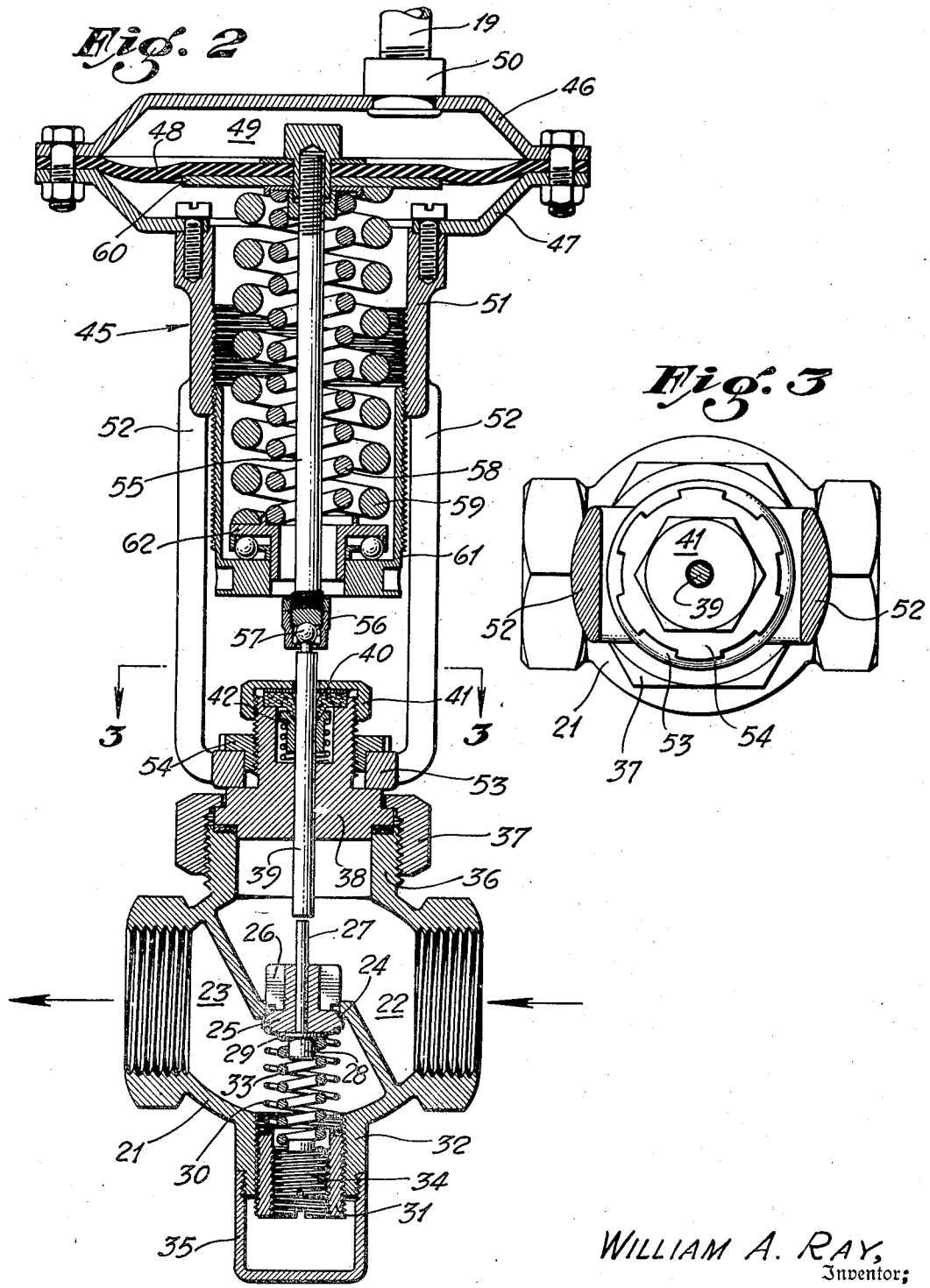
WILLIAM A. RAY,
Inventor;
By John H. Rouse,
Attorney.

Patented Dec. 29, 1942

2,306,903

UNITED STATES PATENT OFFICE 2,306,903

FUEL GOVERNOR

William A. Ray, Glendale, Calif.

Application December 4, 1939, Serial No. 307,472

3 Claims. (Cl. 137—139)

My present invention relates to automatic fuel governors for regulating the supply of fuel to an oil burner in accordance with variation in the presence of the steam generated in a boiler by said burner.

An object of my invention is the provision of a novel return line fuel governor of the character described, whereby a "high fire" or a "low fire" condition of an oil burner is automatically provided, in accordance with a predetermined variation in the steam pressure, by variation of the pressure of the oil supplied to said burner.

Another object is the provision of a fuel governor of the character described which employs a single valve means for controlling the oil pressure to effect either a high or a low fire condition of the burner.

Another object is the provision, in a fuel governor of the character described, of oil pressure regulating means normally biased to effect a high pressure condition, and means actuated by steam pressure of a predetermined value for partially relieving the force of said bias.

Other objects and advantages of my invention will be found in the description, the drawings, and the appended claims.

For complete understanding of the invention, reference may be had to the following detailed description and accompanying drawings, wherein:

Figure 2 is an enlarged sectional view of the fuel governor shown in Fig. 1;

Figure 3 is a section taken along the line 3—3 of Fig. 2; and

Figure 1:
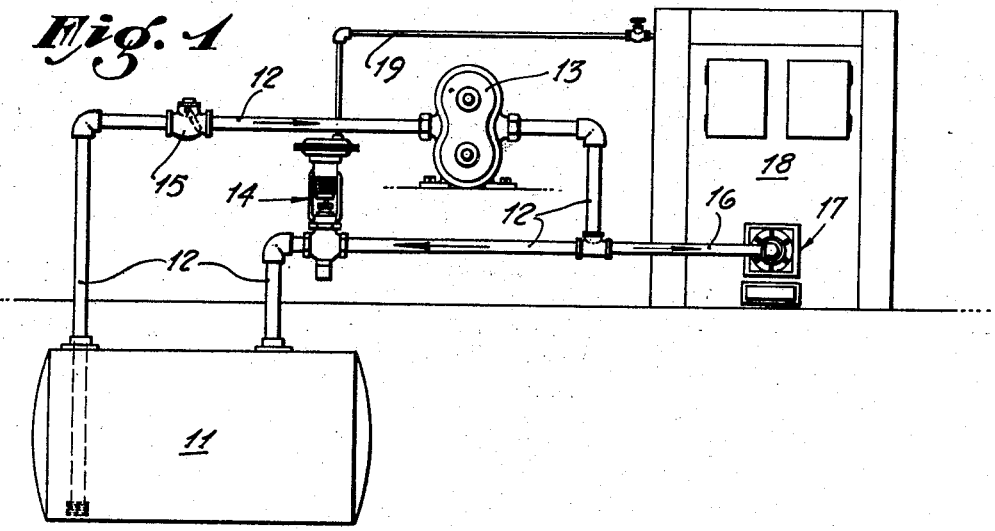
Figure 1 is a partly diagrammatic view of an oil burner fuel supply control system including a fuel governor embodying my invention.

In Fig. 1 of the drawings, the numeral 11 indicates a fuel oil reservoir to which is connected a main conduit 12 through which oil from the reservoir is circulated in the direction of the arrows by a pump 13 connected in said main conduit and arranged to be driven at a constant speed by a motor (not shown). In the oil return portion of said main conduit is a fuel governor or regulator, generally indicated at 14, for regulating the pressure of the oil in the main conduit between the pump and the regulator. A check valve 15 functions to prevent backward flow of the oil in the main conduit. Branched from the main conduit, intermediate the pump and the regulator, is a conduit 16 for supplying fuel to an oil burner 17 for a water boiler 18. Connecting the upper area of said boiler with the top of said regulator is a conduit 19.

Referring now to Figs. 2 and 3, the numeral 21 indicates a valve casing having an inlet 22 and an outlet 23 separated by a ported partition provided with a valve seat 24. Cooperable with said seat is a valve member 25 having a vaned guide portion 26. Extending through a concentric opening in said valve member, and freely slidable therein, is a rod 27 having a head 28 and a flange portion 29 normally abutting the lower surface of said valve member.

A spring 30, compressed between the lower end of the valve member and a hollow adjusting screw 31 threaded in an opening in a boss 32 formed on the bottom of the valve casing, urges the valve member 25 upward to closed position. A second spring 33, compressed between the flange 29 of rod 27 and an adjusting screw 34 threaded in the hollow screw 31, also urges the valve member to closed position. A sealing cap 35 is provided to prevent leakage from the boss portion 32 of the valve casing.

The upper portion of the valve casing 21 is provided with a threaded extension 36 to which is secured, by a nut 37, a guide member 38 for a rod 39 axially aligned with the rod 27. Sealing means for rod 39 is provided by a packing member 40 which is held in place by a cap 41 threaded on the guide member. Said packing member is compressed against the surface of the rod by a spring-urged member 42 having a tapered annular recess cooperable with the lower portion of the packing member.

A fluid pressure operated device, generally indicated by the numeral 45, comprises an upper 46 and a lower 47 dished housing member secured together by their flanges with the margin of a flexible diaphragm 48 therebetween to form a pressure chamber 49, communication with which is provided by a fitting 50 for the reception of the conduit 19. The lower dished member 47 is centrally apertured and is supported by a tubular member 51 having a pair of dependent arms 52 terminating in an annular portion 53 for attachment to the valve casing 21 by a nut 54 threaded on the member 38. The diaphragm 48 is provided with an operating stem 55, on the lower end of which is threaded a separable socket 56 for the reception of a ball 57 formed on the upper end of rod 39.

The diaphragm 48 is upwardly biased by a pair of springs 58 and 59 compressed between a plate 60, provided below the diaphragm, and the lower inner end of a hollow adjusting nut 61 threaded in the member 50, a ball bearing thrust member 62 being interposed below the spring to minimize friction when the compression of the spring is varied.

The operation of the system shown in Fig. 1 will now be described.

It is to be understood that the pump 12 is driven at a constant speed, preferably being connected directly to the oil burner motor. The oil burner 17, which is supplied with fuel through the branch conduit 16, is provided with a fixed or semi-fixed orifice so that the size of the oil burner flame is governed solely by the pressure of the oil in conduit 16. It will be assumed that for a "high" fire an oil pressure of, for example, 50 pounds is required, and for a "low" fire a pressure of 10 pounds; and that a low fire condition is desirable only when the steam pressure in the boiler exceeds a predetermined value, such as, for example, 100 pounds, and that a high fire is always desirable when steam pressure is lower, while the burner is operating. It will be understood that the oil and steam pressures assumed are only by way of example, as in practice wide variation from these values may be desirable.

Assuming first that the steam pressure in the boiler 18 is less than 100 pounds, and that the springs 58 and 59 have been so adjusted as to resist movement of the diaphragm 40 by fluid pressure in chambers 49 of less than 100 pounds, the lower end of rod 39, connected to the diaphragm stem 55 will be just out of engagement with the rod 27, against the flange 29 of which the inner spring 33 is compressed. Consequently, the oil pumped into the inlet 22 of the valve must force the valve member 25 open against the force of both the inner and the outer springs 30 and 33. These springs have been so adjusted that their combined forces are such that fluid pressure of 50 pounds is required to open the valve and permit the oil to circulate through the main conduit. The pressure in the burner supply branch conduit 16 will therefore be such that a high fire condition will be attained. This pressure of oil in the system will be maintained while the spring bias on the valve member remains unchanged.

If the steam pressure now rises above 100 pounds, the diaphragm is moved downward against the force of springs 58 and 59 bringing the end of rod 39 into engagement with rod 27. On further downward movement, the rod 27 is moved with respect to the valve member so as to partially relieve the force on the valve member of the inner spring 33, the valve now offering less resistance to oil circulation, the pressure in the conduits consequently decreasing.

When the rod 27 is moved still further downward by the steam pressure on the diaphragm, the force of the inner spring 33 is completely released and only the outer spring 30 opposes the opening of the valve member. This outer spring has been so adjusted that the oil pressure in the system is now 10 pounds, which is that required to produce a low fire condition at the burner.

When the steam pressure is reduced below 100 pounds, the diaphragm is moved upward, releasing the engagement of rods 35 and 27 and thus permitting the combined forces of the inner and the outer valve springs to again be applied to the valve member to effect a high pressure oil condition.

Obviously, by adjustment of screws 31 and 34 the forces of springs 30 and 33 can be varied so as to effect other desired oil pressures, and by adjustment of nut 61 the operating value of the steam pressure can be varied.

It will be realized that the change from high to low oil pressure on initial downward movement of rod 27 to relieve the force of the inner valve spring, will not be abrupt on account of variation of oil consumption by the burner under varying pressures.

Figure 4:
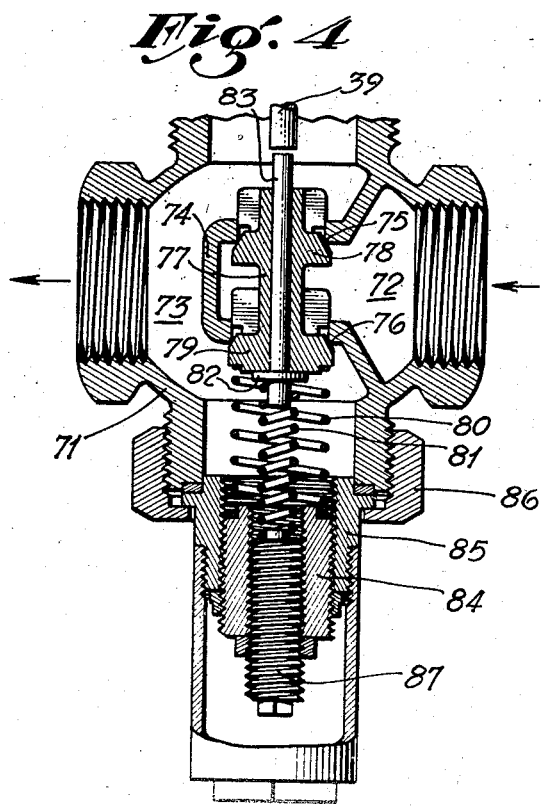
Figures 4 and 5 are fragmentary sectional views of modified forms of fuel governors embodying my invention.
Figure 5:
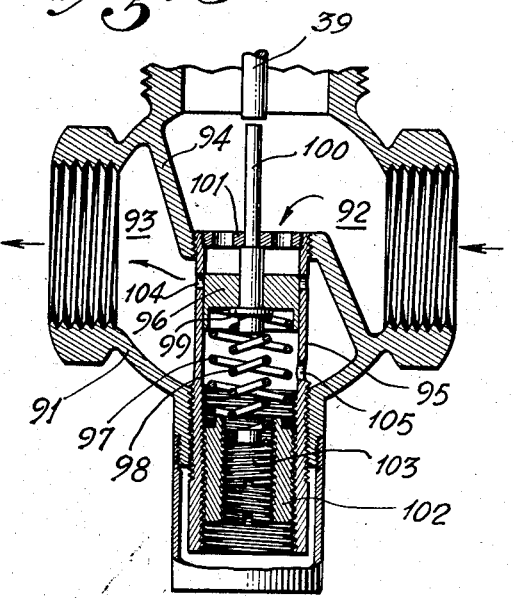

The modified forms of valves shown in Figs. 4 and 5 are intended for use in conjunction with a fluid pressure operated device such as that shown in Fig. 2, only the lower portion of the diaphragm operated stem 39 being shown in these figures.

The operation of the regulator when combined with the modified forms of valves shown in Figs. 4 and 5 is substantially identical with that of the regulator previously herein described.

In Fig. 4 the numeral 71 indicates a valve casing having an inlet 72 and an outlet 73 separated by a partition 74 which is provided with a pair of valve ports having valve seats 75 and 76. A double valve member 77, having an upper and a lower portion 78 and 79 cooperable respectively with the seats 75 and 76, is biased to closed position by an outer spring 80 and an inner spring 81 compressed against the flange 82 of a rod 83, freely slidable in the valve member. Adjusting means for the outer spring 80 is provided by a hollow screw 84, threaded in a hollow extension member 85 secured to the bottom of the valve casing by a nut 86; and a screw 87, threaded in the screw 84, provides means for adjusting the inner spring 81.

The area of the lower valve port, with which the portion 79 of the valve member cooperates, is greater than that of the upper port. Because of this unbalance, fluid pressure in the inlet 72 tends to open the valve. The chief advantage of this form of valve is in its greater flow capacity.

As was described in connection with the regulator shown in Fig. 2, when the rod 39 is moved by steam pressure in the diaphragm chamber into engagement with rod 83, the force of the inner spring 81 is relieved and the valve offers reduced resistance to the circulation of the oil.

In Fig. 5, a valve casing 91, having an inlet 92 and an outlet 93, is provided with a partition 94, in an opening in which is threaded the upper end of a tubular member 95. The lower end of this member is threadedly received in an opening formed at the bottom of the valve casing.

Slidable in the tubular member 95 is a piston 96, upwardly biased by an outer spring 97 and an inner spring 98 compressed against the flange 99 of a rod 100 freely slidable in the piston. Upward movement of the rod 100 is limited by a perforated stop member 101 threaded in the upper end of tubular member 95. Adjusting means for springs 97 and 98 are provided by screws 102 and 103, respectively.

In its normal position, the upper end of piston 96 just covers openings 104 provided in the wall of member 95. Fluid back pressure below the piston is prevented by an opening 105 communicating with the valve outlet. Fluid pressure in the valve inlet 92 and above the piston 96 forces the same downward against the bias of springs 97 and 98 to uncover the openings 104. When the rod 39 is moved, by steam pressure in the diaphragm chamber, into engagement with rod 100, the force of the inner spring is released, permitting the piston to operate at reduced pressure.

While I have herein shown and described specific embodiments of my invention, I wish it to be understood that modifications may be made without departing from the spirit of my invention. I intend therefore to be limited only by the scope of the appended claims.

I claim as my invention:

1. In a regulator for controlling the pressure of liquid fuel supplied to a burner, a valve casing having an inlet and an outlet, a partition separating said inlet and said outlet and provided with a valve port, a valve member cooperable with said port, a pair of springs urging said valve member toward closed position, said valve member being so arranged that liquid pressure in said inlet is effective to move said valve member toward open position against the force of said springs, and means for releasing the force on said valve member of only one of said springs.

2. In a regulator for controlling the pressure of liquid fuel supplied to a burner, a valve casing having an inlet and an outlet, a partition separating said inlet and said outlet and provided with a valve port, a valve member cooperatable with said port, a pair of springs urging said valve member toward closed position, said valve member being so arranged that liquid pressure in said inlet is effective to move said valve member toward open position against the force of said springs, and a fluid pressure operated motor mounted on said casing and effective when energized to release the force on said valve member of only one of said springs, said motor being operable by the pressure of fluid other than that controlled by said valve member.

3. In a regulator for controlling the pressure of liquid fuel supplied to a burner, a valve casing having an inlet and an outlet, a partition separating said inlet and said outlet and provided with a valve port, a valve member cooperable with said port, a pair of springs urging said valve member toward closed position, said valve member being so arranged that liquid pressure in said inlet is effective to move said valve member toward open position against the force of said springs, means movable to release the force on said valve member of only one of said springs, and a fluid pressure operated motor mounted on said casing and having a member so positioned as to engage and thereby move said last-named means when said motor is energized, said motor being operable by the pressure of fluid other than that controlled by said valve member.

WILLIAM A. RAY.